UNITED STATES PATENT OFFICE 2,338,384

DICHLOROETHYL ETHER EXTRACTION PROCESS

Jack Robinson, Wood River, and Hugh Lowery, Alton, Ill., assignors to Standard Oil Company, Chicago, Ill., a corporation of Indiana No Drawing. Application October 29, 1942, Serial No. 463,852

4 Claims. (Cl. 252—326)

This invention relates to an improved dichloroethyl ether extraction process and it pertains more particularly to an improved method and means for avoiding emulsification difficulties and increasing the effective capacity of existing extraction units which employ beta, beta' dichloroethyl ether as the extraction solvent. Dichloroethyl ether, $ClCH_2CH_2OCH_2CH_2Cl$, is commonly known in the art as Chlorex (particularly when employed for the solvent extraction of lubricating oils) and the term Chlorex as used in this specification is thus synonymous with beta, beta' dichloroethyl ether.

The use of Chlorex as an extraction solvent for the production of lubricating oils is well known in the art and has been described, for example, in an article by Page, Buchler and Diggs, entitled "Production of lubricating oils by extraction with dichloroethyl ether," published in Industrial and Engineering Chemistry, vol. 25, page 418 (April 1933). The Chlorex extraction process is applicable to all types of petroleum oils and is also applicable to other oils, fats, waxes, etc., of vegetable, animal or mineral origin. The extraction may be carried out batchwise or in stage countercurrent systems or in continuous towers. All of these systems are so well known in the art that further description thereof is unnecessary.

In all solvent extraction processes there must be an intimate mixture between the extracting liquid and the substance which is undergoing extraction. When that substance is likewise a liquid there is always a tendency toward emulsification. Thus in Chlorex-lubricating oil extraction systems there is always a tendency for the formation of oil-Chlorex emulsions. In batch, multiple batch and batch countercurrent systems sufficient settling area and settling time must always be provided to permit proper stratification. In countercurrent tower systems the flow velocities must be such as to permit adequate separation of oil from solvent at the interface. Thus in all extraction systems the throughput is in a large measure limited by emulsification tendencies, usually the tendency of the oil to emulsify in the Chlorex. An object of our invention is to avoid this emulsification tendency and to thereby greatly increase the capacity of existing and future Chlorex extraction units.

We have found that when a preferentially water soluble sulfonic compound such as green acid soap is added to a Chlorex extraction system in concentrations within the approximate range of .005% to .02%, based on Chlorex, the emulsification difficulties in said extraction system may be substantially eliminated and the throughput of the system may be greatly increased. We prefer to add the sulfonic compound with the Chlorex but it may be added with the oil which is undergoing extraction. In systems wherein there is an emulsion "bottle neck" at one particular stage or at one particular point in a tower, we may introduce the green acid soap or other sulfonic compound directly to that portion of the system or into the oil or Chlorex entering that portion of the system. The green acid soap separates from both phases at the interface and minimizes emulsification difficulties at that point.

Green acid soap is a product resulting from acid treating of petroleum oils, particularly viscous petroleum oils such as lubricating stocks. Acid sludge (containing green acids) is separated from acid treated oil (containing mahogany acids). Green acids may be extracted from the acid sludge and subsequently neutralized to form green acid soaps. Alternatively the acid sludge may first be neutralized to form the soaps in situ and the green acid soaps may be thereafter recovered therefrom. Green acids, green acid soaps and their method of preparation and refinement are well known to those skilled in the art and further description thereof is, therefore, unnecessary. (Note U. S. Patents 1,474,933, 1,301,662, etc.)

Green acids have long been known to have the property of breaking aqueous petroleum emulsions (U. S. 1,299,385 and 1,418,781) but in the Chlorex extraction system there is no aqueous phase. Green acid soaps have previously been tested for use in extraction systems employing other solvents such as cresylic acid but oil-cresylic acid emulsions were not prevented or noticeably affected by the use of green acid soaps. Heavy metal salts effective in breaking oil-in-water type emulsions were found to have no appreciable effect on oil-in-Chlorex emulsions. The Chlorex emulsion problem has baffled the art for many years. We have now solved this problem by simply incorporating with the Chlorex (or with the oil to be treated) green acid soap, preferably as a 25% to 30% aqueous solution, in amounts ranging from .005% to about .02% by weight based on Chlorex. It should be noted that the amount of green acid soap thus employed is of a very different order of magnitude than the amounts commonly employed for breaking aqueous emulsions.

In practicing our invention it is unnecessary to modify any of the treating conditions except that the prevention of emulsification difficulties will permit considerably greater throughputs in a given system than were heretofore possible. By adding one gallon of green acid soap stock containing 30% of green acid soap per 10,000 gallons of Chlorex in a lubricating oil extraction system the productive capacity of that system is greatly increased and in some cases may be even doubled.

The addition of the green acid soap to the Chlorex has no deleterious effect on the extractive properties of the solvent or on the yields and qualities of the raffinate and extract. Practically all of the green acid soap added to any particular stage separates at the interface and is drawn off either periodically or continuously at about the same rate as it is added.

The green acid soap ordinarily employed is the sodium soap obtained by ordinary caustic neutralizations but it should be understood that other neutralizing agents may be used and that green acids neutralized by potassium hydroxide, ammonium hydroxide, or other known neutralizing agents may be employed instead of the soda soaps. Also, it is not always essential that the green acids be neutralized since the unneutralized green acids themselves have a marked tendency toward preventing emulsification difficulties in this system. The term "preferentially water soluble sulfonic compounds" is intended to cover both green acid and green acid soaps.

We claim:

1. The method of avoiding emulsification difficulties in a solvent extraction system employing beta, beta' dichloroethyl ether as the extraction solvent which method comprises adding to said system a small amount of a preferentially water-soluble sulfonic compound derived by the action of a sulfonating agent on a petroleum product.

2. The method of avoiding emulsification difficulties in a solvent extraction system employing beta, beta' dichloroethyl ether as the extraction solvent which method comprises adding to said system an amount of a preferentially water-soluble sulfonic compound derived by the action of a sulfonating agent on a petroleum product within the approximate range of .005 to .02%.

3. The method of preventing emulsification difficulties and increasing the effective capacity of a Chlorex extraction system which method comprises adding to the system a small amount of a 25% to 30% green acid soap solution, the amount being within the approximate range of .005 to .02%, and withdrawing green acid soap solution from an interface in said system.

4. The method of preventing emulsification difficulties and increasing the effective capacity of a Chlorex extraction system which method comprises introducing into the Chlorex a small amount of a green acid soap, employing approximately 1 gallon of the green acid soap per 10,000 gallons of Chlorex and withdrawing a green acid soap solution from the system as a separate phase.

JACK ROBINSON.
HUGH LOWERY.